United States Patent [19]
Kasama et al.

[11] Patent Number: 5,854,707
[45] Date of Patent: Dec. 29, 1998

[54] POLARIZING TYPE OPTICAL APPARATUS

[75] Inventors: Nobuyuki Kasama; Yasuyuki Mitsuoka; Yukiya Funanami; Tadao Iwaki, all of Chiba, Japan

[73] Assignee: Seiko Instruments Inc., Japan

[21] Appl. No.: 611,738

[22] Filed: Mar. 6, 1996

[30] Foreign Application Priority Data

Mar. 7, 1995 [JP] Japan .................................. 7-047667

[51] Int. Cl.⁶ .......................... G02B 5/30; G02F 1/1335
[52] U.S. Cl. ......................... 359/487; 359/583; 359/483; 349/9; 353/20
[58] Field of Search .......................... 362/19; 359/495, 359/498, 501, 386, 483, 485, 487, 497, 583; 349/9; 353/20

[56]        References Cited

U.S. PATENT DOCUMENTS

| | | | |
|---|---|---|---|
| 2,958,258 | 11/1960 | Kelly ........................................ | 359/487 |
| 4,864,390 | 9/1989 | McKechnie et al. ...................... | 353/34 |
| 4,966,438 | 10/1990 | Mouchart et al. ....................... | 359/495 |
| 4,974,219 | 11/1990 | Korth ....................................... | 359/495 |
| 5,121,983 | 6/1992 | Lee ........................................... | 353/20 |
| 5,283,600 | 2/1994 | Imai ......................................... | 353/20 |
| 5,309,422 | 5/1994 | Kuroki et al. ........................... | 359/495 |
| 5,357,370 | 10/1994 | Miyatake et al. ....................... | 359/495 |
| 5,453,859 | 9/1995 | Sannohe et al. ......................... | 359/498 |
| 5,625,491 | 4/1997 | von Gunten et al. ................... | 359/498 |

*Primary Examiner*—Cassandra C. Spyrou
*Assistant Examiner*—John Juba, Jr.
*Attorney, Agent, or Firm*—Adams & Wilks

[57]        ABSTRACT

A polarizing type optical apparatus has a first polarizing element disposed in a path of an incident luminous flux produced by a light source and a second polarizing element disposed in the path of a luminous flux reflected from the first polarizing element. The first polarizing element has a p polarized light component transmitting characteristic which varies less with respect to an incident angle of a luminous flux than that of the second polarizing element and has a p polarized light component transmittance which is higher than that of the second polarizing element, and the second polarizing element has an s polarized light component transmitting characteristic which varies less with respect to an incident angle of a luminous flux than that of the first polarizing element and has an s polarized light component transmittance which is lower than that of the first polarizing element, such that the incident luminous flux produced by the light source is irradiated onto the first polarizing element, the luminous flux reflected by the first polarizing element consists mainly of an s polarized light component, and the luminous flux reflected by the second polarizing element consists of a substantially pure s polarized light component.

19 Claims, 8 Drawing Sheets

WAVE LENGTH CHARACTERISTICS
OF FIRST PBS

WAVE LENGTH CHARACTERISTICS
OF SECOND PBS

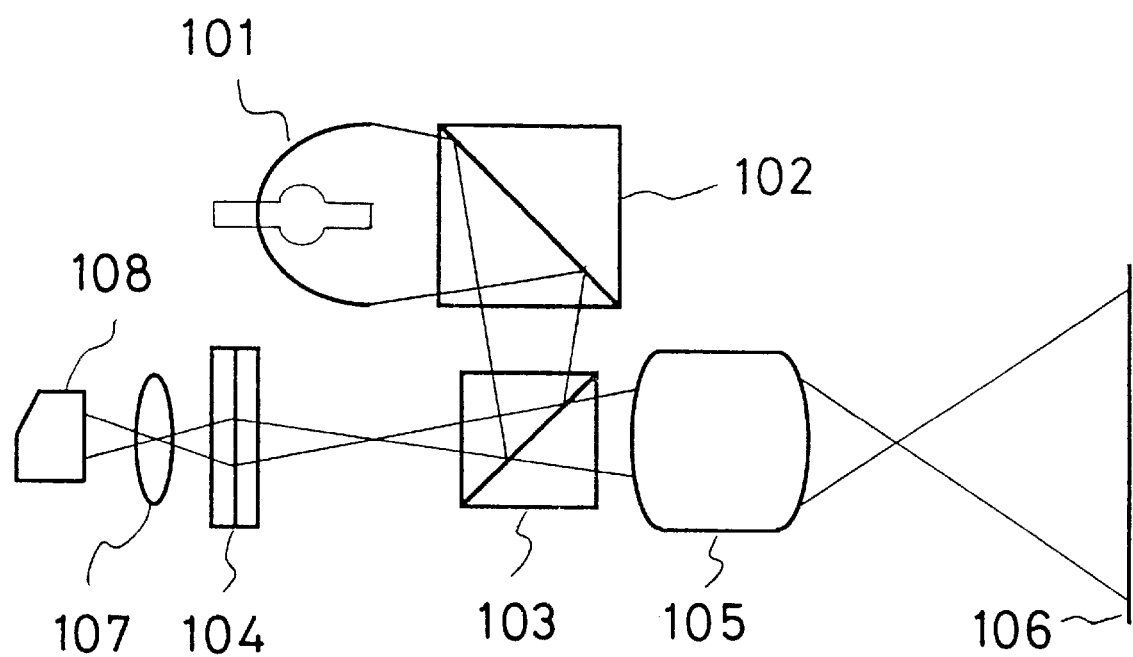
F I G. 1

WAVE LENGTH CHARACTERISTICS
OF FIRST PBS

WAVE LENGTH CHARACTERISTICS
OF SECOND PBS

F I G. 8
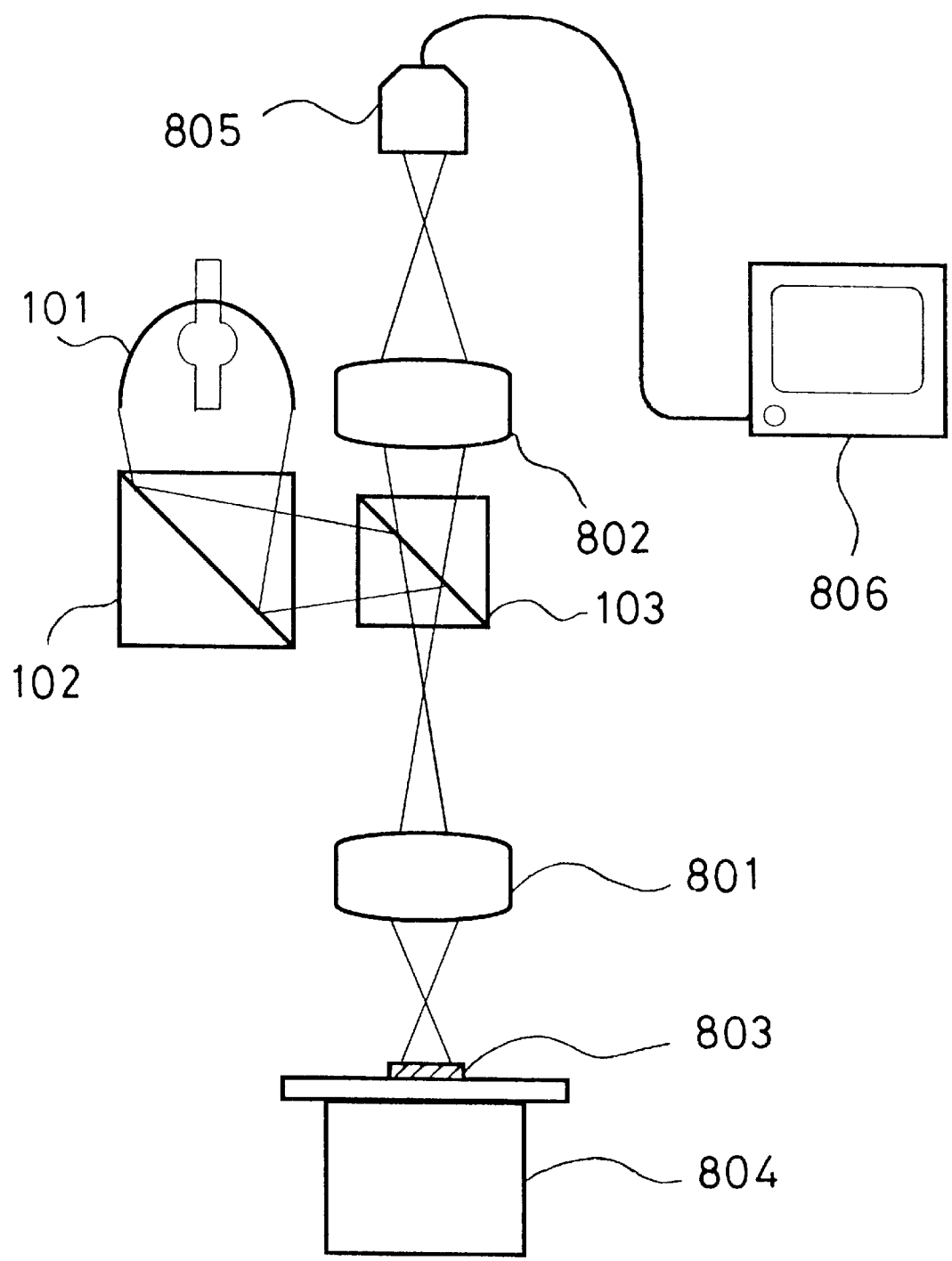

POLARIZING TYPE OPTICAL APPARATUS

BACKGROUND OF THE INVENTION

The present invention relates to a polarizing type optical apparatus such as, for example, an image projecting apparatus or a polarizing type microscope.

As conventional polarizing type optical apparatuses using a polarization of light there are an image projecting apparatus, a polarizing type microscope, etc. The basic structure of these polarizing type optical apparatuses is composed of a light source 1, a polarizing element such as one polarized light beam splitter or one set of polarizing plates, a spatial light modulating element in case of the image projecting apparatus which is used for displaying a projected image, an object to be observed and a stage for fixing the object in the case of the polarizing type microscope.

First, a brief explanation will be given of a structure of a reflecting type optical writing liquid crystal light valve that is used in an image projecting apparatus as a polarizing type optical apparatus.

FIG. 3 is a sectional view illustrating a structure of a reflecting type optical writing liquid crystal light valve. Transparent electrode layers 302a and 302b and orientation film layers 303a and 303b are provided on the surface of transparent substrates 301a and 301b such as glass or plastics for sandwiching liquid crystal molecules. The transparent substrates 301a and 301b on their respective sides facing the orientation film layers 303a and 303b are opposed while controlling the clearance by interposing a spacer 309 thereby sandwiching a liquid crystal layer 304.

Further, a photoconductive layer 305, a light shielding layer 306 and a dielectric mirror 307 are laminated between the transparent electrode layer 302a on the side of writing by light and the orientation film layer 303a and reflectionless coating layers 308a and 308b are formed on outer faces of cells of the transparent substrate 301a on an image writing side of the device and the transparent substrate 301b is provided on the image reading side of the device. As the liquid crystal material of the liquid crystal layer 304, nematic liquid crystals or ferroelectric liquid crystals or the like are typically used. Especially, a reflecting type optical writing liquid crystal light valve using ferroelectric liquid crystals is provided with a very fast operational speed of several hundreds of Hz or more. Although it is known that the reflecting type light writing liquid crystal light valve using the ferroelectric liquid crystals is a device for thresholding and making binary an input image, it is also possible to perform a gray scale display by devising the waveform of a drive voltage.

In reading an image written in such a reflecting type optical writing liquid crystal light valve, firstly, a polarized light component of an incident luminous flux is limited to a linearly polarized light (for example, an s polarized light component) formed by a polarizing plate or the like, that is irradiated on the reflecting type optical writing liquid crystal light valve. Only a linearly polarized light component of a luminous flux reflected by the reflecting type optical writing liquid crystal light valve that is orthogonal to the polarization axis of the linearly polarized light of the incident luminous flux (for example, a p polarized light component), is transmitted through a polarizing plate or the like by which the written image can be read as intensity information. The image read in such a manner becomes a positive image.

Next, a specific explanation will be given of an example of the structure of the conventional image projecting apparatus as a polarizing type optical apparatus with reference to FIG. 4.

This polarizing type optical apparatus is composed of a light source 101, a polarized light beam splitter (hereinafter referred to as a "PBS") 401, a reflecting type optical writing liquid crystal light valve 104, a projecting lens 105, a screen 106, a writing lens 107 and a CRT 108. The image displayed on the CRT 108 is written to the reflecting type optical writing liquid crystal light valve 104 by the writing lens 107. A luminous flux irradiated from the light source 101 has only its s polarized light component reflected by the PBS 401, whereby a linearly polarized luminous flux composed of only the s polarized light component is irradiated on the reflecting type optical writing liquid crystal light valve 104.

The luminous flux reflected by the reflecting type optical writing liquid crystal light valve 104 is transmitted through the PBS 401, with the result that it is possible to read out an image written in the reflecting type optical writing liquid crystal light valve 104 by the CRT 108 and writing lens 107 therefrom. Thereafter, the image thus read out is magnified and projected by the projecting lens 105 onto the screen 106. The contrast of the image projected onto this screen 106 is dependent upon the characteristic of the PBS 401 and the contrast of the reflecting type optical writing liquid crystal light valve 104. Since the contrast ratio of the reflecting type optical writing liquid crystal light valve 104 is more than 500:1, there is virtually no adverse effect upon the contrast of the image projected on the screen 106. Particularly, where the luminous flux irradiated from the light source 101 has a wide waveband and large angle component, the characteristic of the PBS 401 largely influence the contrast of the projected image. For this reason, it becomes a necessary characteristic of the PBS 401 that the p polarized light component transmittance (hereinafter referred to as "Tp") be made as high as possible and the s polarized light component transmittance (hereinafter referred to as "Ts") be made as low as possible.

Also, as in the case of a conventional polarizing type optical apparatus as illustrated in FIG. 5, by using two PBSes having the same characteristic, i.e., a first PBS 501 and a second PBS 502, it is possible to make the contrast higher than the contrast of the conventional polarizing type optical apparatus of FIG. 4.

FIG. 6 illustrates the characteristic of the PBS used in the conventional polarizing type optical apparatus of FIG. 4 or 5.

Assuming that the angular divergence of light which is incident upon the incident surface of a PBS orthogonally with respect thereto is referred to as "an incident angle", FIG. 6 illustrates an example of the characteristic of the PBS 401, first PBS 501, or second PBS 502 or the like in the cases where the incident angle is 0° and 5°. The PBS is designed so that even when an incident angle has been made larger, the Ts is kept suppressed to be low. Therefore, there is a tendency that the larger the incident angle component becomes, the lower the p polarized light component transmittance Tp becomes. In case of the PBS of FIG. 6, when the incident angle was 0°, the average transmittance was such that the Tp was 92% and the Ts was 0.4%, whereas when the incident angle was 5°, the average transmittance was such that the Tp was 80% and the Ts was 0.7%. When PBSes having the characteristic as illustrated in FIG. 6 were used as the first PBS 501 and the second PBS 502, in the resulting conventional polarizing type optical apparatus of FIG. 5 the contrast of an image projected on the screen was approximately 100:1.

Each of these conventional examples is an image projecting apparatus for a black-and-white image. However, by using three elements of a reflecting type optical writing liquid crystal light valve, CRT and writing lens and additionally using a dichroic prism or dichroic filter in order to achieve color separation and synthesization, it is possible to provide a color image projecting apparatus.

Also, the polarizing type microscope as a conventional polarizing type optical apparatus has essentially the same structure as the image projecting apparatus except that in place of the reflecting type optical writing liquid crystal light valve 104 of the image projecting apparatus, an object to be observed is fixed on a stage and observed with the naked eye or by means of a CCD camera.

However, in the above-mentioned polarizing type optical apparatuses, since the luminous flux irradiated from a light source has a wide waveband and large angle component, in order to obtain a high contrast which is more than 100:1 it is necessary to use a very expensive polarizing element. For example, as a vitreous material frequently used in a PBS, there is a cheap material known as BK7. However, there is a problem in that in order to increase the contrast of the resulting polarizing type optical apparatus it has been necessary to use an expensive vitreous material such as LaK 8 or SF 10.

It is also possible to increase the contrast by using BK 7 as vitreous material and using a specific shape of PBS which is not a rectangular parallelopiped. However, there is a problem in that this type of PBS has a disadvantageous factor in terms of the disposition as well as in terms of size and therefore causes the resulting apparatus to become large in size and complex in structure.

SUMMARY OF THE INVENTION

In order to solve the above-mentioned problems, the present invention provides a polarizing type optical apparatus using a light source and at least two polarizing elements, wherein the at least two polarizing elements have different characteristics; and at least one polarizing element thereof is one in which the s polarized light component transmitting characteristic is less varied with respect to an incident angle of a luminous flux upon the polarizing element and the s polarized light component transmittance is low; and at least another polarizing element thereof is one of which the p polarized light component transmitting characterisitic is less varied with respect to an incident angle of a luminous flux upon the polarizing element and the p polarized light component transmittance is high.

BRIEF DESCRIPTION OF THE DRAWINGS

FIG. 1 is a constructional view illustrating a polarizing type optical apparatus according to a first embodiment;

FIG. 8 is a constructional view illustrating a polarizing type optical apparatus according to a third embodiment.

DETAILED DESCRIPTION OF THE PREFERRED EMBODIMENTS

Figure 2A:
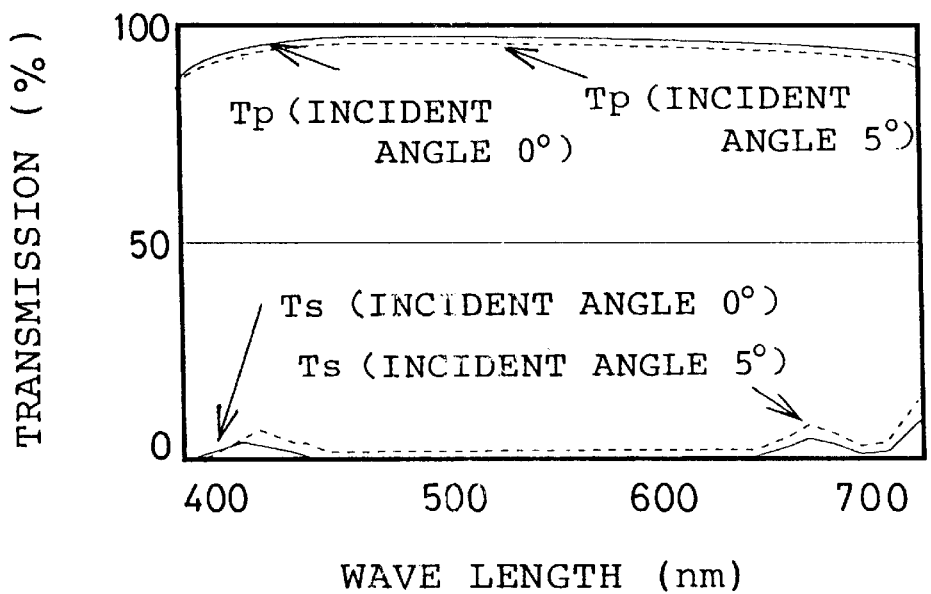
FIG. 2A illustrates a wavelength characteristic of a PBS in accordance with a first embodiment of the present invention.

Ideally, a polarizing element such as a PBS is made to have a Tp of 100% and a Ts of 0%. However, the design and manufacture of such a polarizing element is very difficult. Therefore, usually, the polarizing element is designed and manufactured so that the Ts component is suppressed to be as low as approximately 0% for the purpose of increasing the contrast with respect to a luminous flux incident thereupon at a certain incident angle.

However, in the present invention, increasing the contrast has been realized by using at least two polarizing elements having different characteristics.

The first polarizing element is one which is designed so that the Tp may be as high as possible, while, on the other hand, the Ts is less ideal to some extent, with respect to the wavelength and the incident angle of a luminous flux upon the polarizing element, unlike designing of an ordinary PBS or the like.

The second polarizing element is one which is designed so that the Ts may be as low as possible, while, on the other hand, the Tp is less ideal to some extent, with respect to the wavelength and the incident angle of a luminous flux upon the polarizing element, in order to increase the contrast, as in the case of an ordinary PBS or the like.

The operation of such a device when the polarizing element is a PBS will now be explained.

A white luminous flux having a certain incident angle component transmits through the first PBS part of its s polarized light component and transmits therethrough most of its p polarized light component. This is because the first PBS has its Tp less varied and is high in this transmittance with respect to the incident angle and wavelength. Accordingly, almost no p polarized light component is contained in the luminous flux reflected from the first PBS. That is, although an appreciable amount of luminous flux which consists of a small s polarized light component and a large p polarized light component is contained in the luminous flux transmitting through the first PBS, almost no p polarized light component is instead contained in the luminous flux reflected from the first PBS. Namely, the luminous flux reflected therefrom is for the most part a luminous flux which consists of an s polarized light component.

The luminous flux which consists mostly of an s polarized light component is irradiated on the second PBS and almost entirely reflected by the same. Since the p polarized light component irradiated onto the second PBS is almost nonexistent, even when the Tp component is somewhat low, the p polarized light component reflected from the second PBS is almost zero.

Accordingly, a pure s polarized light component alone is obtained. The pure s polarized light component has its polarized light component changed by the reflecting type optical writing liquid crystal light valve or the like, the resulting luminous flux transmitting through the second PBS, whereby only the p polarized light component alone transmits therethrough. Thus, an image having a high contrast can be obtained. The luminous flux of the s polarized light component which transmits through the second PBS and which has not had its polarized light component changed by the reflecting type optical writing liquid crystal light valve is almost entirely reflected by the second PBS wherein stress is placed upon the Ts component.

Accordingly, the image projected on the screen consists of the p polarized light component, and an image having a very high contrast is obtained.

Embodiments of the present invention will now be explained with reference to the drawings.

(1) First Embodiment

FIG. 1 is a constructional view illustrating a first embodiment of a polarizing type optical apparatus according to the present invention. The polarizing type optical apparatus of the first embodiment is a case of an image projecting apparatus for projecting an image onto, for example, a screen. The first embodiment is composed of a light source 101, at least two polarizing elements consisting of a first PBS 102 and second PBS 103, a reflecting type optical writing liquid crystal light valve 104 for recording a projection image, a CRT 108 and writing lens 107 as writing means for writing an image to the reflecting type optical writing liquid crystal light valve 104, a projection lens 105 for projecting an image recorded in the reflecting type optical writing liquid crystal light valve 104, and a screen 106.

Figure 2B:
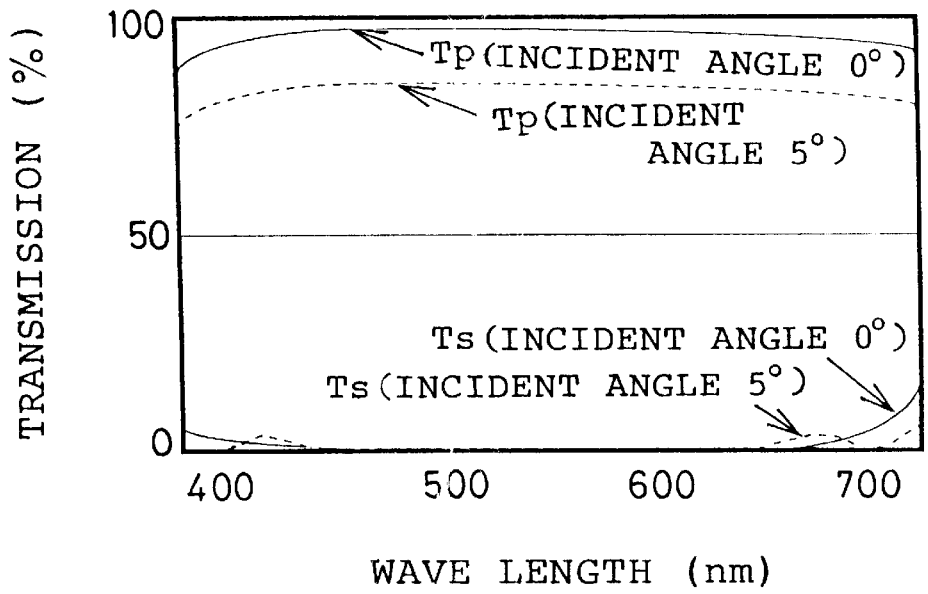
FIG. 2B illustrates a wavelength characteristic of a PBS in accordance with a second embodiment of the present invention.
Figure 3:
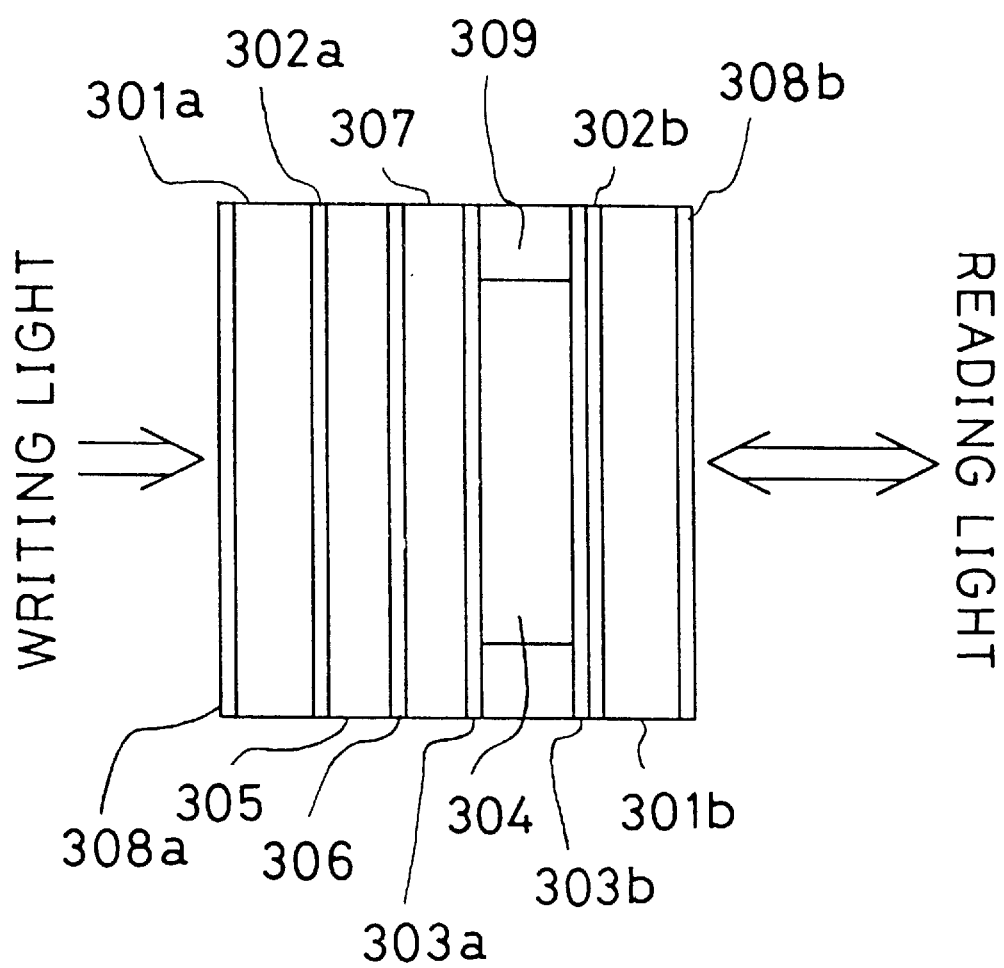
FIG. 3 is a sectional view illustrating the construction of a reflecting type optical writing liquid crystal light valve.
Figure 4:
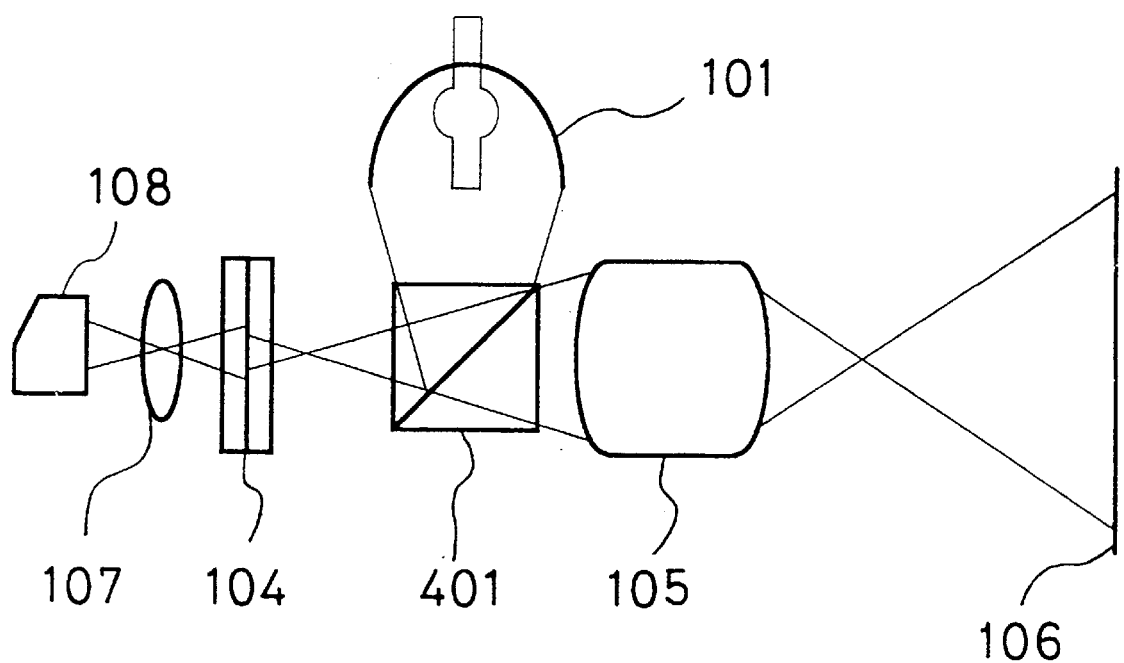
FIG. 4 is a constructional view illustrating a conventional polarizing type optical apparatus.
Figure 5:
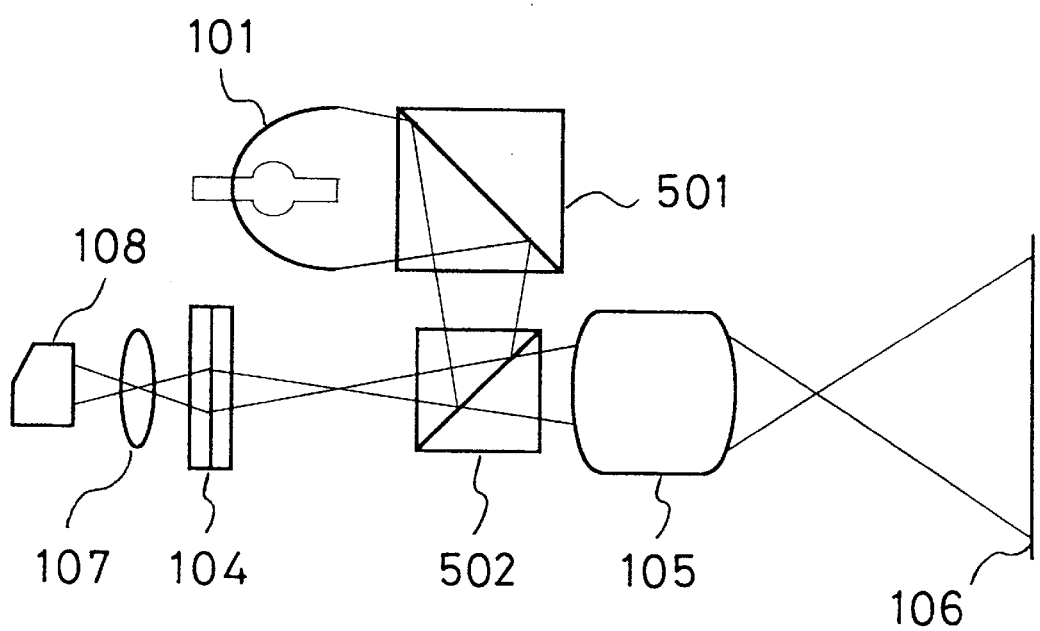
FIG. 5 is a constructional view illustrating a conventional polarizing type optical apparatus.
Figure 6:
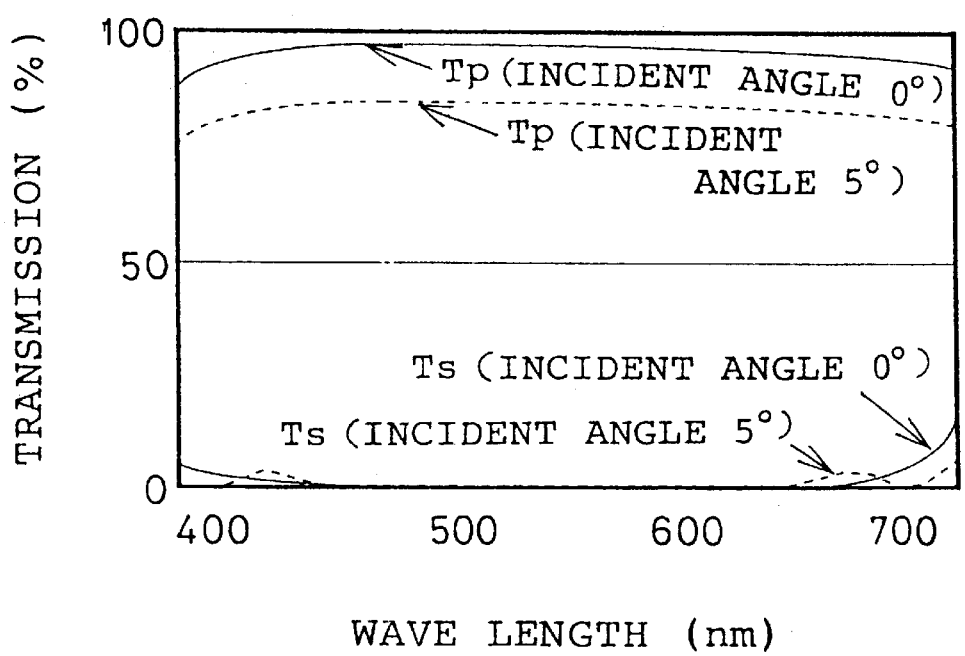
FIG. 6 is a view illustrating a wavelength characteristic of a conventional PBS.

FIGS. 2A and 2B illustrate examples of the wavelength characteristics of the first PBS 102 and second PBS 103 used in the present invention.

The first PBS 102 is designed so that the Tp thereof may be as high as possible with respect to the wavelength and the incident angle of a luminous flux upon the PBS, unlike that of an ordinary PBS or the like. The characteristics of the first PBS 102 are such that even when the incident angle is 5°, the Tp is less varied and kept high. Conversely, the Ts is instead less ideal to some extent and, even when the incident angle is 5°, is permitted to become somewhat high.

The second PBS 103 has been designed so that the Ts may be as low as possible with respect to the wavelength and the incident angle of a luminous flux upon the polarizing element, in order to increase the contrast, as in the case of an ordinary PBS or the like, and that conversely the Tp has been made less ideal to some extent.

In case of the first PBS 102 used in this embodiment, when the incident angle is 0°, the average transmittance is such that the Tp is 90% and the Ts is 0.4%, whereas when the incident angle is 5°, the average transmittance is such that the Tp is 90% and the Ts is 7%. Also, in case of the second PBS 103 used in this embodiment, when the incident angle is 0°, the average transmittance is such that the Tp is 92% and the Ts is 0.4%, whereas when the incident angle is 5°, the average transmittance is such that the Tp is 80% and the Ts is 7%.

The first embodiment of FIG. 1 will now be explained using the first PBS 102 and second PBS 103 having the characteristics illustrated in FIG. 2A and FIG. 2B, respectively.

A white incident luminous flux having a certain angle component which has been emitted from the light source 101 has part of its s polarized light component transmitted through the first PBS 102 but has almost no p polarized light component reflected thereby. Namely most of the p polarized light component transmits therethrough since, in the first PBS 102, the Tp is less varied and kept high with respect to the angle and wavelength. Accordingly, almost no p polarized light component is contained in the luminous flux reflected by the first PBS 102. That is, although an appreciable amount of p polarized light component is contained in the luminous flux transmitting through the first PBS 102, almost no p polarized light component is contained in the luminous flux reflected by the first PBS 102, whereby a luminous flux consisting mostly of an s polarized light component is obtained therefrom.

The luminous flux which consists mainly of an s polarized light component alone is irradiated on the second PBS 103, whereby the s polarized light component is for the most part reflected thereby. Since the p polarized light component irradiated on the second PBS 103 is almost zero, the p polarized light component reflected by the second PBS 103 is almost zero even if the Tp is somewhat low.

Accordingly, only a pure s polarized light component is obtained. An image displayed by the CRT 108 is written by the writing lens 107 to the reflecting type optical writing liquid crystal light valve 104 and recorded therein. The luminous flux reflected by the second PBS 103 which consists of the pure s polarized light component alone is irradiated on the reflecting type optical writing liquid crystal light valve 104 and has its polarized light component changed in correspondence with the image written in the reflecting type optical writing liquid crystal light valve 104, after which the resulting luminous flux transmits through the second PBS 103. That is, only the p polarized light component transmits through it. The image having transmitted through the second PBS 103 which consist of substantially the p polarized light component is projected by the projection lens 105 onto the screen 106. The s polarized light component having been reflected by the reflecting type optical writing liquid crystal light valve 104 is for the most part reflected by the second PBS 103, with the result that it does not reach the screen 106. Accordingly, an image having a high contrast can be obtained on the screen 106. The luminous flux of the s polarized light component which transmits through the second PBS 103 without having its polarized light component changed by the reflecting type optical writing liquid crystal light valve 104 is for the most part reflected by the second PBS 103 wherein stress is placed on Ts. In this embodiment, the contrast of the projected image which had been projected on the screen 106 was more than 200:1.

Although in this embodiment a PBS has been used as the polarizing element, it will be appreciated that even when a polarizing plate and a beam splitter are used, the same effect can be obtained. Further, although this embodiment has referred to a case of the image projecting apparatus for a black-and-white image, it will be appreciated that if color separation is performed using a color separation dichroic filter or the like and three reflecting type optical writing liquid crystal light valves are used, a color image projecting apparatus can be prepared whereupon it is possible to obtain the same effect as that obtained with the first embodiment. Furthermore, although in this embodiment an incoherent light source has been used as the light source, it is needless to say that the same effect can be obtained with the use of even a coherent light source.

(2) Second Embodiment

Figure 7:
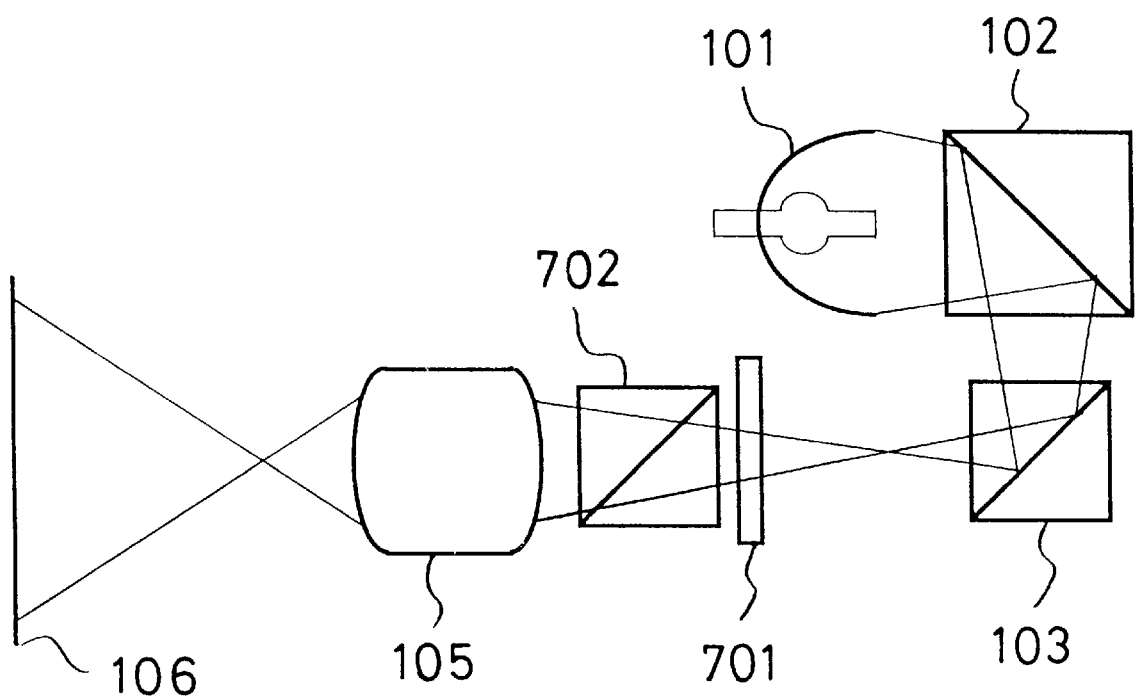
FIG. 7 is a constructional view illustrating a polarizing type optical apparatus according to a second embodiment.

FIG. 7 illustrates a second embodiment of the polarizing type optical apparatus according to the present invention.

This second embodiment refers to a case where a transmission type thin film transistor (TFT) panel is used in place of the reflecting type optical writing liquid crystal light valve used in the first embodiment. Therefore, explanation of the same constructional components as those of the first embodiment is partly omitted or simplified.

As in the case of the first embodiment illustrated in FIG. 1, a luminous flux having a certain angle component which has been irradiated from a light source 101 can have only its pure s polarized light component extracted therefrom by a first PBS 102 and a second PBS 103. The luminous flux of the s polarized light component thus extracted is irradiated onto a TFT panel 701 in which a projection image is written.

The luminous flux irradiated transmits through the TFT panel 701 and then through a third PBS 702. The image which has transmitted through the third PBS 702 is magnified and projected on a screen 106 by a projection lens 105. Note that a PBS having the same characteristic as that of the second PBS 103 has been used as this third PBS 702. That is, a PBS is used that is designed so that even when the incident angle has become large, the Ts may be suppressed to be low. As a result of this, an image having a contrast ratio of more than 200:1 is projected on the screen.

Although in this embodiment a PBS has been used as the polarizing element, it will be appreciated that even when a polarizing plate and a beam splitter are used, the same effect can be obtained. Particularly, it is needless to say that by using a polarizing element as the third PBS 702 the same effect can be obtained. Further, although in this embodiment reference has been made to a case of an image projecting apparatus for a black-and-white image, it will be appreciated that if color separation is performed using a color separation dichroic filter or the like and color synthesization is again performed using three TFT panels, it is possible to provide a color image projecting apparatus and obtain the same effect as that in the case of the first embodiment. Also, although in this embodiment an incoherent light source has been used as the light source, that the same effect can be obtained with the use of a coherent light source as well.

(3) Third Embodiment

FIG. 8 is a constructional view illustrating a third embodiment of the polarizing type optical apparatus according to the present invention. This third embodiment refers to a polarizing type microscope in particular. The third embodiment is an embodiment wherein, in the first embodiment of FIG. 1, in place of the reflecting type optical writing liquid crystal light valve 104 an observation substance 803 and a stage 804 are used and observation thereof is performed using a CCD camera 805. Therefore, as regards the same constructional components as those of the first embodiment explanation of this embodiment is partly omitted or simplified.

As in the case of the first embodiment illustrated in FIG. 1, a luminous flux having a certain angle component which has been irradiated from a light source 101 can have only its pure s polarized light component extracted therefrom by a first PBS 102 and a second PBS 103. The luminous flux of pure s polarized light component thus extracted is irradiated by an irradiation lens 801 onto the observation substance 803 placed on the stage 804. Then, the polarized light is changed due to the index of double refraction of the observation object 803 and is imaged on the CCD camera 805 by the irradiation lens 801 and an imaging lens 802. At this time, the p polarized light component alone is permitted to transmit through the second PBS 103 disposed between the irradiation lens 801 and the imaging lens 802, wherein stress is put on Ts, with the result that the observation substance 803 is observed on the CCD camera 805.

Accordingly, an image having a very high contrast is observed on a monitor 806 in the same way as in the case of the first embodiment of FIG. 1.

It is possible to provide an inexpensive and small-sized polarizing type optical apparatus without, in the polarizing type optical apparatus using a PBS and the like, using a PBS formed of expensive vitreous material such as LaK8 or SF10, a specific shape of PBS such as a PBS which is not a rectangular parallelopiped, or a PBS formed of liquid in place of glass in order to obtain a high contrast of image.

Also, the polarizing type optical apparatus of the present invention can provide a contrast which is twice or more as high as the contrast of a polarizing type optical apparatus which uses two conventional PBSes each formed of vitreous material such as BK 7. The PBSes may also consist of a multilayer dielectric film.

What is claimed is:

1. A polarizing type optical apparatus, comprising:
a light source for producing an incident luminous flux having a predetermined bandwidth; a first polarizing element disposed in a path of the incident luminous flux; and a second polarizing element disposed in the path of a luminous flux reflected from the first polarizing element; wherein the first polarizing element has a p polarized light component transmitting characteristic which varies less with respect to an incident angle of a luminous flux than that of the second polarizing element and has a p polarized light component transmittance which is higher than that of the second polarizing element and the second polarizing element has an s polarized light component transmitting characteristic which varies less with respect to an incident angle of a luminous flux than that of the first polarizing element and has an s polarized light component transmittance which is lower than that of the first polarizing element, such that the incident luminous flux produced by the light source is irradiated onto the first polarizing element, the luminous flux reflected by the first polarizing element consists mainly of an s polarized light component, and the luminous flux reflected by the second polarizing element consists of a substantially pure s polarized light component.

2. A polarizing type optical apparatus as set forth in claim 1; wherein each of the first and second polarizing elements comprises a polarized light beam splitter consisting of a dielectric multi-layer film formed by laminating a plurality of dielectric films each having a predetermined thickness.

3. A polarizing type optical apparatus according to claim 1; wherein each of the first and second polarizing elements comprises a polarized light beam splitter.

4. A polarizing type optical apparatus according to claim 3; further comprising image projecting means for projecting an image when irradiated with the pure s polarized light component reflected by the second polarizing beam splitter.

5. A polarizing type optical apparatus according to claim 4; wherein the image projecting means comprises a CRT for producing an image, a writing lens for projecting the image, a reflecting type optical writing liquid crystal light valve for recording the image produced by the CRT, the reflecting type optical writing liquid crystal light valve being disposed in a path of the pure s polarized light component reflected by the second polarized light beam splitter and having a writing side on which the image is projected for recording the image and a reading side on which the pure s polarized light component is irradiated for reading the recorded image, and a projection lens for projecting the image read out from the reflecting type optical writing liquid crystal light valve.

6. A polarizing type optical apparatus according to claim 5; wherein the reflecting type optical writing liquid crystal light valve comprises a pair of opposed transparent substrates, transparent electrodes provided on facing surfaces of the opposed transparent substrates, orientation film layers provided on facing surfaces of the transparent substrates, and a liquid crystal layer disposed between the transparent substrates.

7. A polarizing type optical apparatus according to claim 6; wherein the reflecting type optical writing liquid crystal light valve further comprises a photoconductive layer, a light shielding layer, and a dielectric mirror laminated between the transparent substrates on the writing side of the device, and an orientation layer and antireflective coatings on outer surfaces of the transparent substrates.

8. A polarizing type optical apparatus according to claim 4; wherein the image projecting means comprises a transmissive thin film transistor panel for displaying an image disposed in a path of the pure s polarized light component reflected by the second polarized light beam splitter, and a projection lens for projecting the image displayed on the transmissive thin film transistor panel.

9. A polarizing type optical apparatus according to claim 3; further comprising an observation stage for supporting a sample disposed in a path of the pure s polarized light component reflected by the second polarized light beam splitter; and observation means for recording a luminous flux reflected from the sample and passing through the second polarizing element.

10. A polarizing type optical apparatus comprising: a light source for producing an incident luminous flux; a first polarizing element disposed in a path of the luminous flux; and a second polarizing element disposed in a path of a portion of a luminous flux reflected by the first polarizing element; wherein the first polarizing element has a greater p-polarized light component transmittance than the second polarizing element and the second polarizing element has a lower s-polarized light component transmittance than the first polarizing element.

11. A polarizing type optical apparatus according to claim 10; wherein the first polarizing element has a p-polarized light component transmittance which varies less with respect to an angle of incidence of a luminous flux than that of the second polarizing element, and the second polarizing element has an s-polarized light component transmittance which varies less with respect an angle of incidence of a luminous flux than that of the first polarizing element.

12. A polarizing type optical apparatus according to claim 10; wherein at least one of the first and second polarizing elements comprises a polarized light beam splitter.

13. A polarizing type optical apparatus according to claim 12; wherein the first and second polarizing elements each comprise a polarized light beam splitter, the incident luminous flux being irradiated onto the first polarized light beam splitter for transmitting most of the p polarized light of the incident luminous flux and reflecting most of the s polarized light of the incident luminous flux, the reflected s polarized light being irradiated onto the second polarized light beam splitter for transmitting the remaining p polarized light and reflecting the s polarized light component so that a substantially pure s polarized light is reflected from the second polarized beam splitter.

14. A polarizing type optical apparatus according to claim 13; further comprising image projecting means for projecting an image when irradiated with the pure s polarized light component reflected by the second polarizing beam splitter.

15. A polarizing type optical apparatus according to claim 14; wherein the image projecting means comprises a CRT for producing an image, a writing lens for projecting the image, a reflecting type optical writing liquid crystal light valve for recording the image produced by the CRT, the reflecting type optical writing liquid crystal light valve being disposed in a path of the pure s polarized light component reflected by the second polarized light beam splitter and having a writing side on which the image is projected for recording the image and a reading side on which the pure s polarized light component is irradiated for reading the recorded image, and a projection lens for projecting the image read out from the reflecting type optical writing liquid crystal light valve.

16. A polarizing type optical apparatus according to claim 15; wherein the reflecting type optical writing liquid crystal light valve comprises a pair of opposed transparent substrates, transparent electrodes provided on facing surfaces of the opposed transparent substrates, orientation film layers provided on facing surfaces of the transparent substrates, and a liquid crystal layer disposed between the transparent substrates.

17. A polarizing type optical apparatus according to claim 16; wherein the reflecting type optical writing liquid crystal light valve further comprises a photoconductive layer, a light shielding layer, and a dielectric mirror laminated between the transparent substrates on the writing side of the device, and an orientation layer and antireflective coatings on outer surfaces of the transparent substrates.

18. A polarizing type optical apparatus according to claim 14; wherein the image projecting means comprises a transmissive thin film transistor panel for displaying an image disposed in a path of the pure s polarized light component reflected by the second polarized light beam splitter; and a projection lens for projecting the image displayed on the transmissive thin film transistor panel.

19. A polarizing type optical apparatus according to claim 13; further comprising an observation stage for supporting a sample disposed in a path of the pure s polarized light component reflected by the second polarized light beam splitter; and observation means for recording a luminous flux reflected from the sample and passing through the second polarizing element.

\* \* \* \* \*